United States Patent
Koo

(10) Patent No.: US 9,195,106 B2
(45) Date of Patent: Nov. 24, 2015

(54) DISPLAY DEVICE INCLUDING ELECTROSTATIC PROTECTION CIRCUIT AND METHOD OF MANUFACTURING THE SAME

(75) Inventor: Bon-Yong Koo, Cheonan-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 588 days.

(21) Appl. No.: 13/537,543

(22) Filed: Jun. 29, 2012

(65) Prior Publication Data

US 2013/0050173 A1 Feb. 28, 2013

(30) Foreign Application Priority Data

Aug. 30, 2011 (KR) ........................ 10-2011-0087213

(51) Int. Cl.
*H01L 27/02* (2006.01)
*G02F 1/1362* (2006.01)

(52) U.S. Cl.
CPC .............................. *G02F 1/136204* (2013.01)

(58) Field of Classification Search
USPC .................................................. 345/212–215
See application file for complete search history.

(56) References Cited

U.S. PATENT DOCUMENTS

| 7,342,579 B2* | 3/2008 | Chou et al. ..................... 345/214 |
| 2007/0007523 A1* | 1/2007 | Lai .................................. 257/59 |
| 2007/0120790 A1* | 5/2007 | Jeon ................................. 345/87 |
| 2009/0251447 A1* | 10/2009 | Wu et al. ....................... 345/205 |

FOREIGN PATENT DOCUMENTS

| JP | 09-311311 | 12/1997 |
| KR | 1020100075304 | 7/2010 |
| KR | 1020100093509 | 8/2010 |

* cited by examiner

*Primary Examiner* — Robin Mishler
(74) *Attorney, Agent, or Firm* — F. Chau & Associates, LLC

(57) ABSTRACT

A display device in accordance with an exemplary embodiment of the inventive concept includes a data line transferring a drive signal to a display area; and an electrostatic transistor portion including a plurality of thin film transistors connected in parallel between the data line and a common ESD electrode. A cut-off voltage for turning off each of the thin film transistors is provided to a gate of each of the thin film transistors.

16 Claims, 10 Drawing Sheets

DISPLAY DEVICE INCLUDING ELECTROSTATIC PROTECTION CIRCUIT AND METHOD OF MANUFACTURING THE SAME

CROSS-REFERENCE TO RELATED APPLICATIONS

This U.S. non-provisional patent application claims priority under 35 U.S.C. §119 to Korean Patent Application No. 10-2011-0087213, filed on Aug. 30, 2011, the disclosure of which is incorporated by reference herein.

BACKGROUND

The present inventive concept relates to display devices including an electrostatic protection circuit and methods of manufacturing the same.

A liquid crystal display may include an array substrate having a thin film transistor, a color filter substrate, and a display panel. The color filter substrate faces the array substrate and includes a color filter. The display panel includes liquid crystal formed between the array substrate and the color filter substrate.

The array substrate may include gate lines, data lines, and a pixel region including pixels. The gate lines may extend in a first direction and the data lines may extend in a second direction perpendicular to the first direction. Each pixel may include a thin film transistor TFT connected to a gate line and a data line, and a liquid crystal capacitor connected to the TFT. The pixels may be located in a matrix pattern.

A gate driver and a data driver may be disposed around the pixel region. The gate driver may be formed on the display panel using the same process that was used to form the TFT. The gate driver generates scan signals for application to the gate lines. The data driver may be implemented in a chip form. The data driver generates data signals for application to the data lines.

Static electricity may be generated due to friction during manufacturing or testing of the array substrate. Damage to display devices included in the display panel may occur when the static electricity flows into the liquid crystal panel. An electrostatic protection circuit may be included in the display panel to prevent damage caused by the static electricity.

However, the electrostatic protection circuit provides a path of current leakage. Consequently, the electrostatic protection circuit increases power consumption while the display panel operates.

SUMMARY

A display device according to an exemplary embodiment of the inventive concept includes a data line transferring a drive signal to a display area and an electrostatic transistor portion including a plurality of thin film transistors connected in parallel between the data line and a common ESD electrode. A cut-off voltage for turning off each of the thin film transistors is supplied to a gate of each of the thin film transistors.

A method of manufacturing a display device including an electrostatic protection circuit connected to a data line providing a drive signal to a display area includes forming a plurality of thin film transistors connected in parallel between the data line and a common ESD electrode and forming a conductive line for applying a cut-off voltage for turning off each of the thin film transistors to a gate of each of the thin film transistors.

A display device according to an exemplary embodiment of the inventive concept includes a plurality of data lines configured to receive respective data voltages, a plurality of pixels connected respectively to the data lines, an electrode line, a plurality of bilateral diodes, and a plurality of thin film transistors. Each bilateral diode is connected between a corresponding one of the data lines and the electrode line. Each thin film transistor is connected in parallel between a common ESD electrode and each data line.

BRIEF DESCRIPTION OF THE FIGURES

Exemplary embodiments of the inventive concept will be described below in more detail with reference to the accompanying drawings. The embodiments of the inventive concept may, however, be embodied in different forms and should not be constructed as limited to the exemplary embodiments set forth herein. Like numbers refer to like elements throughout.

DETAILED DESCRIPTION

Figure 1:
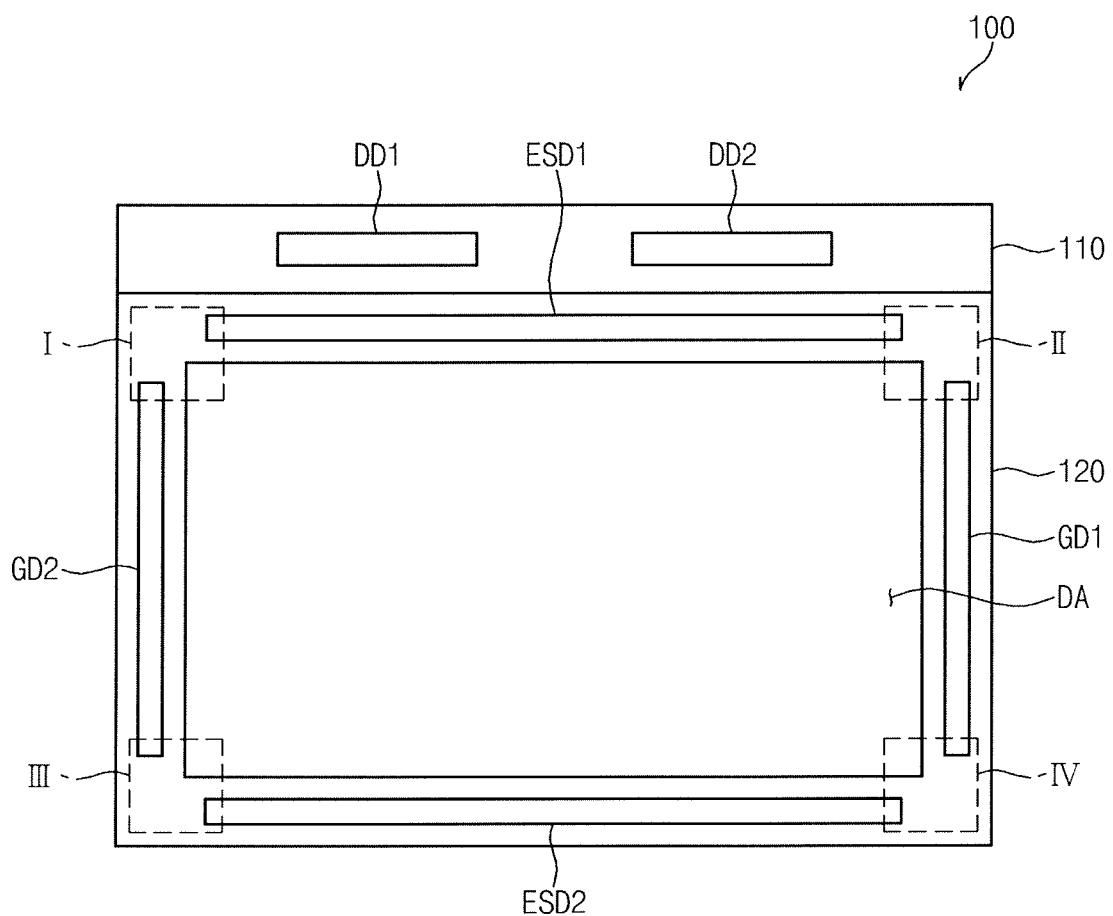
FIG. 1 is a top plan view illustrating a display device in accordance with an exemplary embodiment of the inventive concept.

The inventive concept will be described more fully hereinafter with reference to the accompanying drawings, in which exemplary embodiments thereof are shown. The inventive concept may, however, be embodied in many different forms and should not be construed as limited to the embodiments set forth herein. In the drawings, the size and relative sizes of layers and regions may be exaggerated for clarity. Like numbers refer to like elements throughout.

FIG. 1 is a top plan view illustrating a display device in accordance with an exemplary embodiment of the inventive concept. Referring to FIG. 1, the display device 100 includes a first substrate 110 and a second substrate 120. The first and second substrates 110 and 120 form a display panel of the display device 100. The display device 100 includes data drivers DD1 and DD2, gate drivers GD1 and GD2, electrostatic protection circuits ESD1 and ESD2 and a display area DA.

The data drivers DD1 and DD2 convert a video signal (not shown) into data voltages and then output the data voltages to data lines (not shown) of the display panel. The data drivers DD1 and DD2 may output the data voltages in response to a control signal supplied from a timing controller (not shown). The data drivers DD1 and DD2 may include a first data driver DD1 located on a left upper portion of the display device 100 and a second data driver DD2 located on a right upper portion of the display device 100.

The gate drivers GD1 and GD2 may output gate signals sequentially to the gate lines (not shown) of the display panel in response to a control signal supplied from the timing controller. The gate drivers GD1 and GD2 are located in a peripheral area outside the display area DA. For example, the first gate driver GD1 is located to the left of the display area DA and the second gate driver is located to the right of the display area DA. The gate drivers GD1 and GD2 may be formed by a thin film process. In an alternate embodiment, only one of the gate drivers is present (e.g., GD1 or GD2).

The electrostatic protection circuits ESD1 and ESD2 are located at an upper portion and a lower portion of the display device 100, respectively, outside the display area DA. In an alternate embodiment only one of the electrostatic protection circuits is present (e.g., ESD1 or ESD2. The data lines transfer video signals from the data drivers DD1 and DD2 to the display area DA. The electrostatic protection circuits ESD1 and ESD2 are connected to the data lines to protect against flow of static electricity into the data lines when the display device 100 operates or during manufacture of the display device 100. For example, each of the electrostatic protection circuits ESD1 and ESD2 may include an electrostatic diode that reduces the amount of electrostatic current that flows into the data lines. Each of the electrostatic protection circuits ESD1 and ESD2 may include an electrostatic transistor to handle the remaining electrostatic current. The electrostatic transistor may be damaged when the remaining electrostatic current is excessive, which may protect one or more thin film transistors TFT in the display area DA.

An electrostatic transistor included in the electrostatic protection circuits ESD1 and ESD2 may be implemented by a ticks thin film transistor. The ticks thin film transistor may receive a gate voltage from at least one of several power lines or signal lines that are located outside the display device 100. Hereinafter, a voltage that is applied to a gate of the ticks thin film transistor and that turns off the ticks thin film transistor is called a cut-off voltage Voff. A first supply voltage VSS1 used in the display device 100 using an amorphous silicon gate (ASG) method may be used as the cut-off voltage Voff. The first supply voltage VSS1 can be <=a ground voltage level used in a drive circuit of the display device 100. According to at least one exemplary embodiment of the inventive concept, the first supply voltage is −7V. However, embodiments of the inventive concept are not limited thereto, as the first supply voltage may vary considerably.

While the display device 100 operates, if the first supply voltage VSS1 is applied to a gate of the first thin film transistor, the first thin film transistor may be turned off. Thus, while the display device 100 operates, power consumption caused by a leakage current of the electrostatic protection circuits ESD1 and ESD2 may be prevented.

Although not illustrated in FIG. 1, the display device 100 may include a timing controller. The timing controller receives a video signal and a control signal (not shown) from an external device to convert a data format of the video signal to a data format of the data drivers DD1 and DD2. The video signal may include red, green, and blue RGB data. The timing controller provides the formatted video signal to the data drivers DD1 and DD2. Although not illustrated in FIG. 1, the timing controller may provide a data control signal to the data drivers DD1 and DD2. For example, the data control signal may include an output start signal and a horizontal start signal. The timing controller may provide a gate control signal to the gate drivers GD1 and GD2. For example, the gate control signal may include a vertical start signal, a vertical clock signal and an inverted vertical clock signal.

An electrostatic transistor included in the electrostatic protection circuits ESD1 and ESD2, is configured to capture static electricity flowing into a data line during a manufacturing process of the display device 100. For example, excessive static electricity damages or causes a break in an electrostatic transistor during manufacturing instead of a thin film transistor of a pixel. However, while the display device 100 is driven, the electrostatic transistors cause a leakage current, which increases power consumption. According to at least one embodiment of the inventive concept, the electrostatic transistor can be configured to prevent this unintended power consumption while the display device 100 is driven.

Figure 2A:
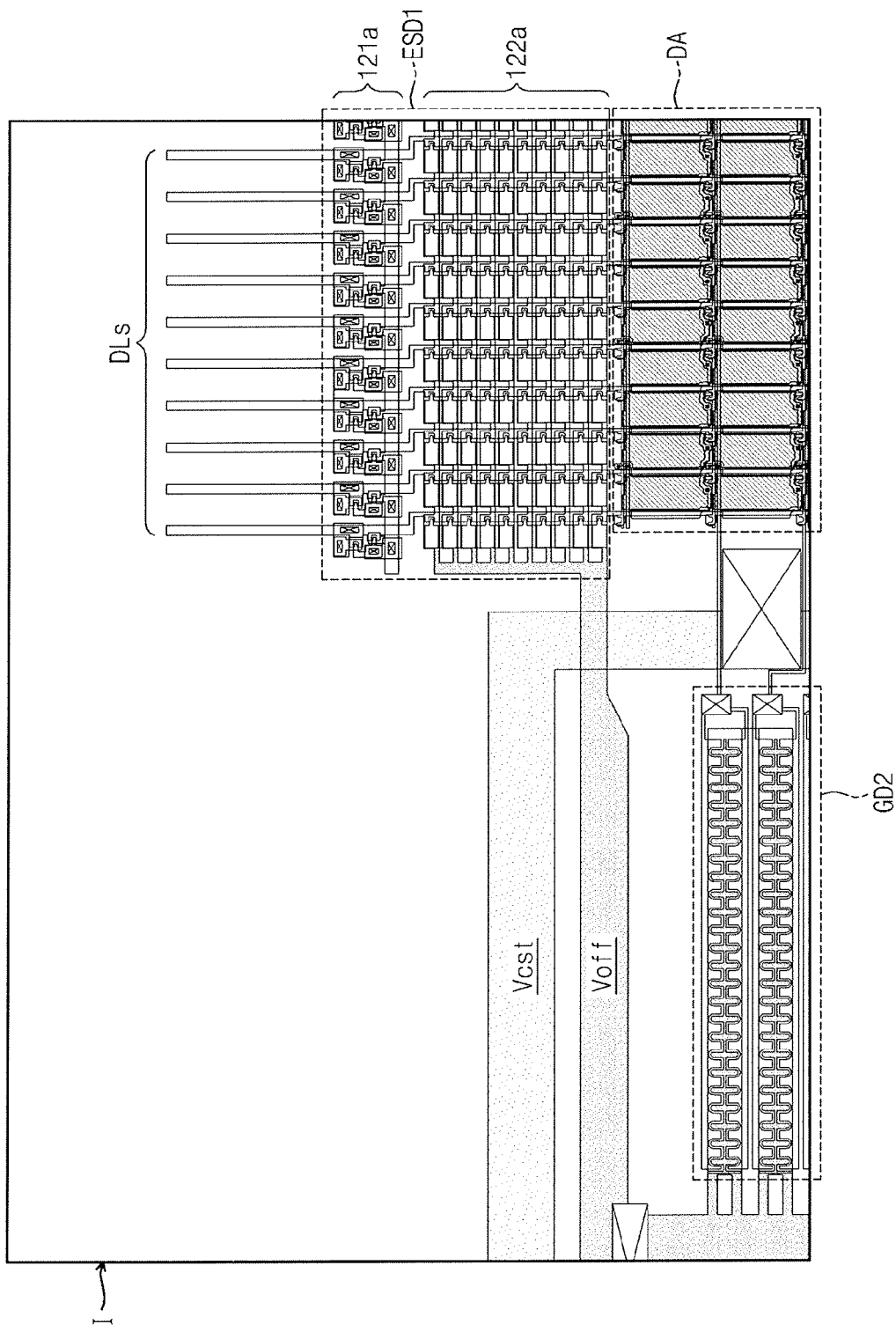
FIG. 2A is a top plan view illustrating a first region (I) illustrated in FIG. 1 in accordance with an exemplary embodiment of the inventive concept.
Figure 2B:
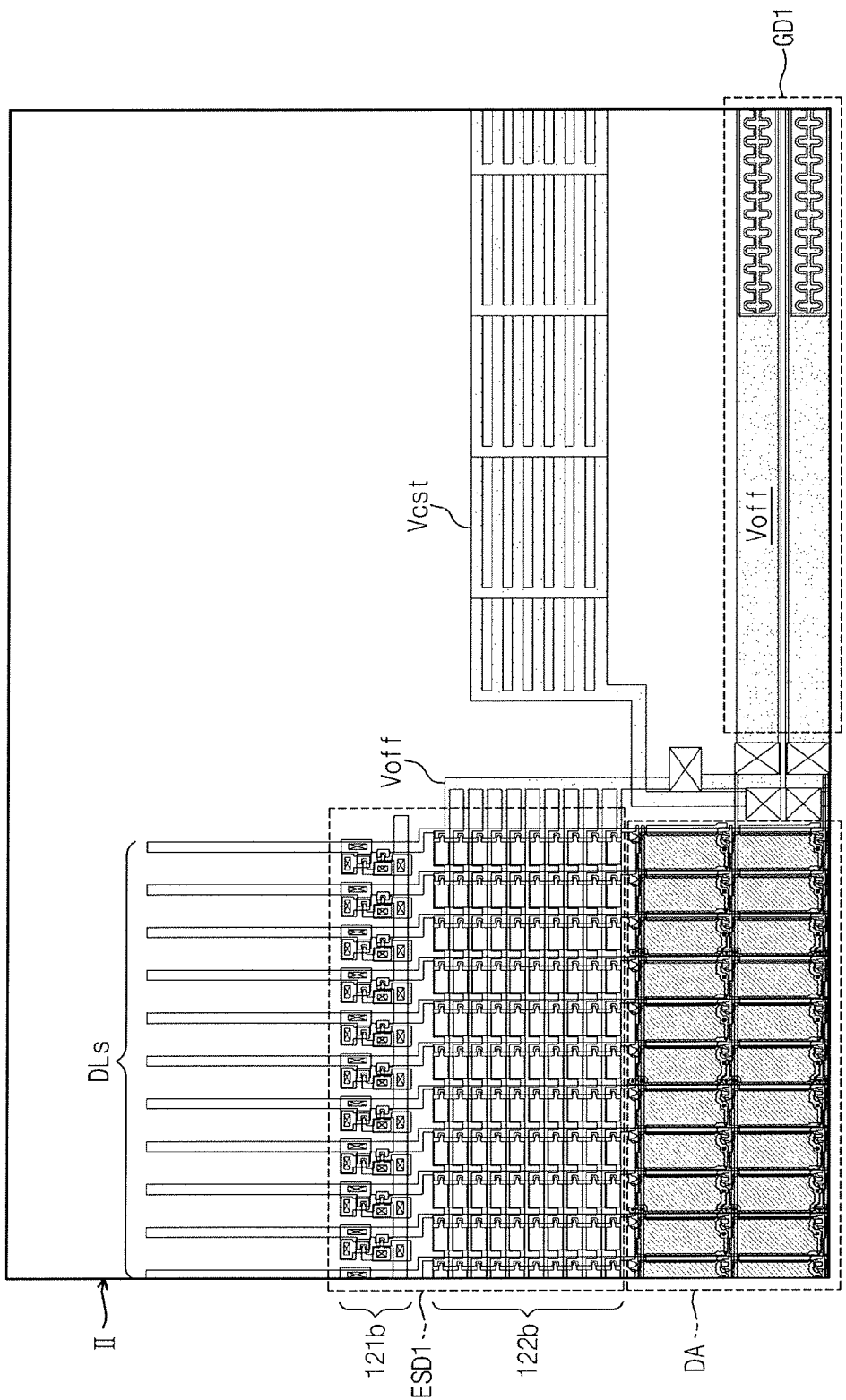
FIG. 2B is a top plan view illustrating a second region (II) illustrated in FIG. 1 in accordance with an exemplary embodiment of the inventive concept.
Figure 2C:
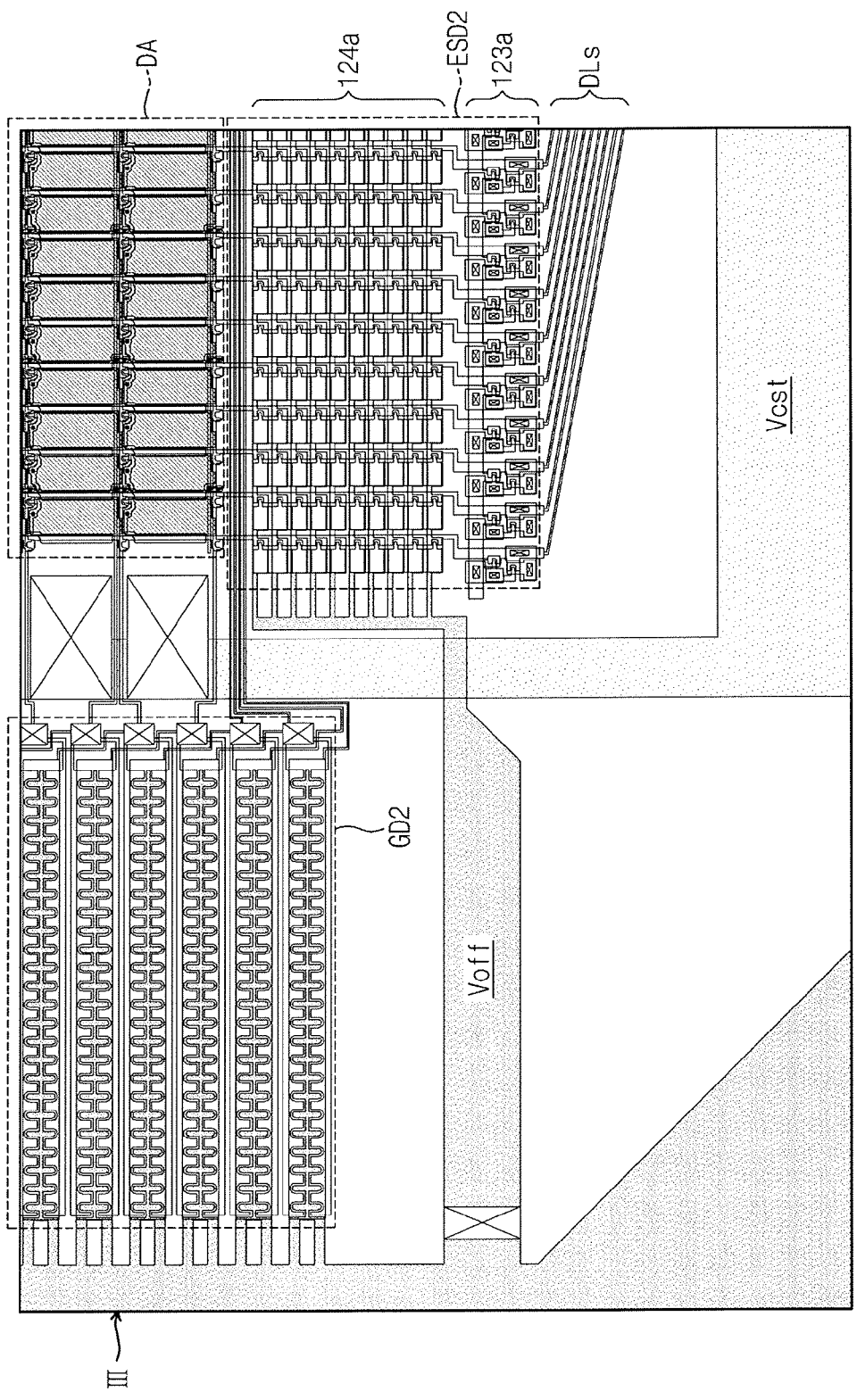
FIG. 2C is a top plan view illustrating a third region (III) illustrated in FIG. 1 in accordance with an exemplary embodiment of the inventive concept.
Figure 2D:
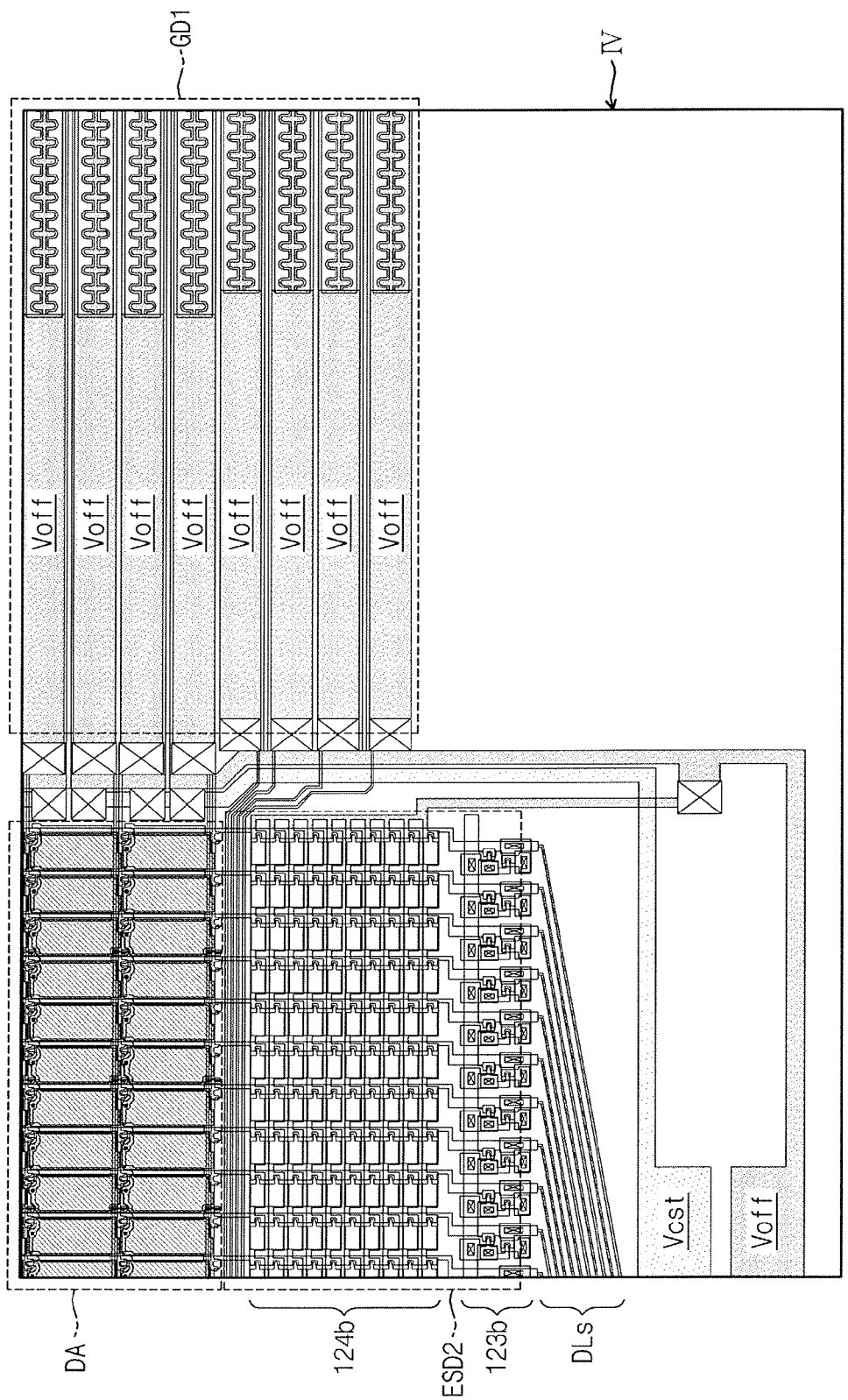
FIG. 2D is a top plan view illustrating a fourth region (IV) illustrated in FIG. 1 in accordance with an exemplary embodiment of the inventive concept.

FIGS. 2A through 2D are top plan views illustrating corners of the display device of FIG. 1. FIG. 2A is a top plan view illustrating a first region (I) illustrated in FIG. 1 in detail. FIG. 2B is a top plan view illustrating a second region (II) illustrated in FIG. 1 in detail. FIG. 2C is a top plan view illustrating a third region (III) illustrated in FIG. 1 in detail. FIG. 2D is a top plan view illustrating a fourth region (IV) illustrated in FIG. 1 in detail.

Referring to FIG. 2A, portions of the first electrostatic protection circuit portion ESD1, the display area DA and the second gate driver GD2 are illustrated in the first region (I) located at a left upper portion of the second substrate 120. The first electrostatic protection circuit portion ESD1 includes an electrostatic diode portion 121a and an electrostatic transistor portion 122a.

Each of data lines DLs connected to thin film transistors of pixels in the display area DA is connected to the first electrostatic circuit portion ESD1. The electrostatic diode portion 121a, the electrostatic transistor portion 122a and thin film transistors TFTs of the display area DA may be connected to each of the data lines DLs in parallel. According to an embodiment, the cut-off voltage Voff is supplied to gates of transistors of the electrostatic transistor portion 122a. The cut-off voltage Voff may be, for example, the first supply voltage VSS1 of about −7V. To supply the cut-off voltage Voff to the gates of the transistors of the electrostatic transistor portion 122a, any one of power lines or signal lines formed outside the display device 100 may be used. In the display device 100 using the ASG method, a power line supplying the first supply voltage VSS1 (e.g., about −7V) may be connected to the gates of transistors of the electrostatic transistor portion 122a. In an alternate embodiment, a voltage generator (not shown) is located in the peripheral area outside the drawing area DA, which supplies the first supply voltage VSS1 via a power line that connects from the voltage generator to gates of the transistors of the electrostatic transistor portion 122a.

A storage voltage Vest (e.g., about 3.3V) may be supplied to gates of the transistors of the electrostatic transistor portion 122a that are implemented by thin film transistors TFTs of which the gate electrode and the drain electrode are capacitively coupled. Accordingly, while the display device 100 operates, thin film transistors of the electrostatic transistor portion 122a are turned on. Thus, a leakage current occurs in a common ESD electrode of the electrostatic transistor portion 122a by a voltage of the data line DLs. However, thin film transistors of the electrostatic transistor portion 122a may be turned off by the cut-off voltage Voff such as the first supply voltage VSS1. If the thin film transistors of the electrostatic transistor portion are turned off, a leakage current flowing through the thin film transistors may be cut off. As a leakage current is cut off, power consumption may be reduced.

Referring to FIG. 2B, portions of the first electrostatic protection circuit portion ESD1, the display area DA and the first gate driver GD1 that are connected to data lines DLs are illustrated in the second region (II) located at a right upper portion of the second substrate 120. The first electrostatic protection circuit portion ESD1 includes an electrostatic diode portion 121b and an electrostatic transistor portion 122b.

The first electrostatic protection circuit portion ESD1 is connected to the data lines DLs that are connected to the thin film transistors of the display area DA. The electrostatic diode portion 121b, the electrostatic transistor portion 122b and thin film transistors TFTs of the display area DA may be connected to each of the data lines DLs in parallel. The first supply voltage VSS1 (e.g., about −7V) may be supplied to gates of the electrostatic transistors 122b as a cut-off voltage Voff. The cut-off voltage Voff may be, for example, the first supply voltage VSS1 of about −7V. To provide a cut-off voltage Voff to gates of the transistors of the electrostatic transistor portion 122b, any one of power lines formed outside the display device 100 may be electrically connected to the gates of the transistors of the electrostatic transistor portion 122b. In an embodiment, the power line for supplying a cut-off voltage Voff to the first gate driver GD1 is electrically connected to the gates of the transistors of the electrostatic transistor portion 122b by using a conductive line and a contact.

Referring to FIG. 2C, portions of the second electrostatic protection circuit portion ESD2, the display area DA and the second gate driver GD2 are illustrated in the third region (III) located at a left lower portion of the second substrate 120. The second electrostatic protection circuit portion ESD2 includes an electrostatic diode portion 123a and an electrostatic transistor portion 124a.

The second electrostatic protection circuit portion ESD2 is connected to the data lines DLs connected to the thin film transistors of the display area DA. In an embodiment, the electrostatic diode portion 123a, the electrostatic transistor portion 124a, and thin film transistors TFTs of the display area DA are connected to each of the data lines DLs in parallel. The cut-off voltage Voff may be supplied to gates of the transistors of the electrostatic transistor portion 124a. To supply the cut-off voltage Voff to the gates of the transistors of the electrostatic transistor portion 124a, the first supply voltage VSS1 may be applied to a power line located outside the display device 100 that is electrically connected to the gates. In an embodiment, the power line for supplying the first supply voltage VSS1 to the second gate driver GD2 is electrically connected to the gates of the transistors of the electrostatic transistor portion 124a using a conductive line and a contact.

Referring to FIG. 2D, portions of the second electrostatic protection circuit portion ESD2, the display area DA and the first gate driver GD1 are illustrated in the fourth region (IV) located at a right lower portion of the second substrate 120. The second electrostatic protection circuit portion ESD2 includes an electrostatic diode portion 123b and an electrostatic transistor portion 124b.

The second electrostatic protection circuit portion ESD2 is connected to the data lines DLs that are connected to the thin film transistors of the display area DA. In an embodiment, the electrostatic diode portion 123b, the electrostatic transistor portion 124b and thin film transistors TFTs of the display area DA are connected to each of the data lines DLs in parallel. The cut-off voltage Voff may be supplied to gates of transistors of the electrostatic transistor portion 124b. To supply the cut-off voltage Voff to the gates of the transistors of the electrostatic transistor portion 124b, any one line having a negative voltage among various supply lines may be electrically connected to the gates of the transistors of the electrostatic transistor portion 124b.

A storage voltage Vcst may be supplied to a gate of the transistors of the electrostatic transistor portion 124b that are implemented by thin film transistors TFTs of which the gate electrode and the drain electrode are capacitively coupled. Accordingly, while the display device 100 operates, the electrostatic transistor portion 124b maintain a turn-on state and charges charged in the data lines may be leaked through the thin film transistor TFTs. If the electrostatic transistor portion 124b is turned off by providing the cut-off voltage Voff to gates of the transistors of the electrostatic transistor portion 124b, power consumption due to a leakage current may be prevented.

Figure 3:
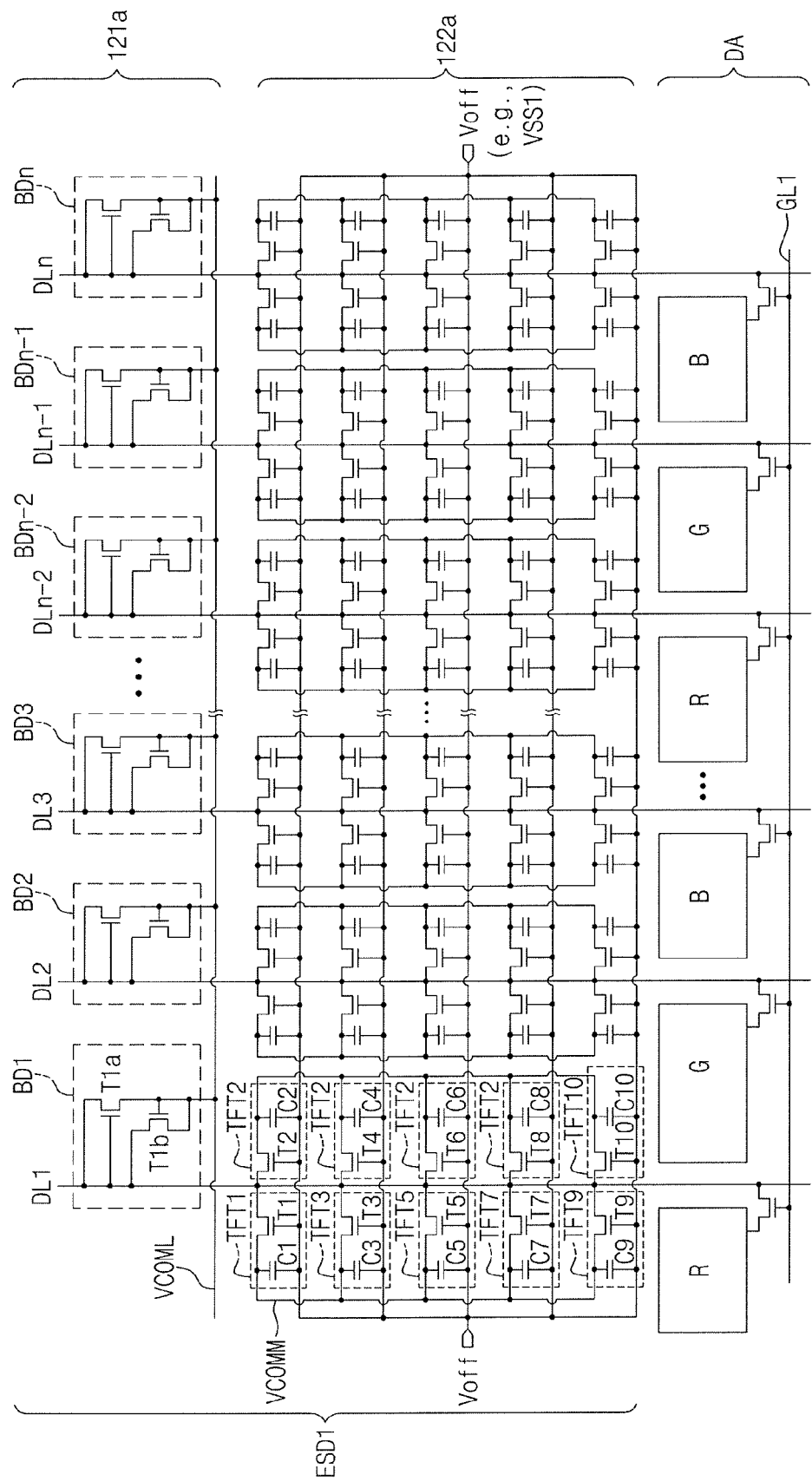
FIG. 3 is an equivalent circuit illustrating a first electrostatic protection circuit ESD1 that may be included in FIG. 2A in accordance with an exemplary embodiment of the inventive concept.

FIG. 3 is circuit illustrating an equivalent circuit of a first electrostatic protection circuit ESD1 and a display area illustrated in FIG. 2A. Referring to FIG. 3, the first electrostatic protection circuit portion ESD1 includes an electrostatic diode portion 121a and an electrostatic transistor portion 122a. In an embodiment, thin film transistors connected to the data lines DLs and a gate line GL1 are arranged per unit pixel.

The electrostatic diode portion 121a includes a plurality of bilateral diodes BD1-BDn connected between each of the data lines DL1-DLn and a common ESD electrode line VCOML. Each of the bilateral diodes BD1-BDn may include a pair of diodes (or, a pair of transistors of which gates and drains are connected together) that is connected to a data line in a reverse direction and a forward direction respectively between the data line DLx (e.g., x is an integer) and the common ESD electrode line VCOML. For example, one of the diodes of the pair may be configured to only pass or primarily pass current in one direction from a data line to the common ESD electrode line VCOML, while the other diode only passes or primarily passes current in an opposite direction from the common ESD electrode line VCOML to the data line. Each of the bilateral diodes BD2-BDn may have the same structure as the bilateral diode BD1. In an alternate embodiment, each bilateral diode includes a single Zener diode instead of two separate diodes. A Zener diode allows current to flow in the forward direction in the same manner as an ideal diode, but will also permit it to flow in the reverse direction when the voltage is above a certain value known as the breakdown voltage.

In an alternate embodiment, as discussed above, the bilateral diode BD1 include two transistors T1a and T1b of which gates and drains are connected together. A gate of the transistor T1a is connected to the data line DL1. Any one of drain and source of the transistor T1a is connected to the data line DL1 and the other is connected to the common ESD electrode line VCOML. A gate of the transistor T1b is connected to the common ESD electrode line VCOML. Any one of drain and source of the transistor T1*b* is connected to the data line DL1 and the other is connected to the common ESD electrode line VCOML.

According to the above-described connections, the transistor T1*a* operates as a diode connected in a forward direction from the data line DL1 to the common ESD electrode line VCOML and the transistor T1*b* operates as a diode connected in a reverse direction from the data line DL1 to the common ESD electrode line VCOML. Each of the bilateral diodes BD2-BDn may have the same structure as the bilateral diode BD1.

When a high voltage is applied to the data line DL1 due to static electricity, the bilateral diode BD1 may discharge charges charged in the data line DL1 to the common ESD electrode line VCOML. For example, if an electric potential of the data line DL1 becomes higher than a threshold voltage of the bilateral diode BD1, the bilateral diode BD1 is turned on. The data line DL1 and the common ESD electrode line VCOML are electrically connected to each other. By the electrical connection, charges charged in the data line DL1 flow into the common ESD electrode line VCOML.

An electric potential of the common ESD electrode line VCOML may be increased by the charges that flowed into the common ESD electrode line VCOML from the data line DL1. Diodes connected in a forward direction from the common ESD electrode line VCOML to the data lines DL2-DLn are turned on when the electric potential of the common ESD electrode line VCOML is increased. Thus, the charges that flowed into the common ESD electrode line VCOML are distributed to the data lines DL2-DLn. Accordingly, thin film transistors of pixels of the display area DA may be protected from a shock caused by static electricity that flowed into the data line DL1.

If an electric potential of the data line DL1 is lower than a threshold voltage of the bilateral diode BD1, the bilateral diode BD1 may maintain a turn-off state and the data line DL1 is electrically cut off from the common ESD electrode line VCOML. Through the structure described above, the electrostatic diode portion 121*a* may distribute charges flowing into the data lines DL1-DLn by static electricity. Thus, elements located at the display area DA may be protected from an effect of static electricity transferred through the data lines DL1-DLn.

The electrostatic transistor portion 122*a* includes a plurality of thin film transistors connected to the data lines DL1-DLn. Each of the thin film transistors may be, for example, a first thin film transistor TFT. Each of the thin film transistors may be represented by an equivalent circuit of a transistor and a capacitor. A structure and a function of the electrostatic transistor portion 122*a* will be described through a structure of thin film transistors TFT1-TFT10 connected to the data line DL1.

A first thin film transistor TFTI connected to the data line DL1 may be equivalently represented by a transistor T1 and a capacitor C. A cut-off voltage Voff is applied to a gate of the transistor T1. A drain (or, source) of the transistor T1 is connected to the data line DL1 and a source (or drain) of the transistor T1 is connected to the common ESD electrode VCOMM. The capacitor C1 is connected to the common ESD electrode VCOMM and the gate of the transistor T1. The common ESD electrode VCOMM may maintain a floating state even while the display device is manufactured or is driven. The thin film transistors TFT2-TFT10 may be equivalently represented by the same elements as the first thin film transistor TFT1.

While manufacturing the display device, gates of the thin film transistors TFT1-TFT10 are maintained in an electrically isolated floating state. In an embodiment, the common ESD electrode VCOMM of the thin film transistors TFT1-TFT10 is maintained in a floating state. At this time, static electricity of a high voltage may flow into the data line DL1 to cause charges to be transferred to the display area DA via the data line. However, the common ESD electrode VCOMM has a relatively low voltage as compared to the data line DL1. Capacitors formed between the data line DL1 and the common ESD electrode VCOMM sequentially break with the charge transfer. The broken capacitors may cause a short circuit between the data line DL1 and the common ESD electrode VCOMM. Charges induced by static electricity are discharged into the common ESD electrode VCOMM and an electric potential of the data line DL1 may be lowered. Through the above-mentioned procedure, a high voltage by static electricity may be prevented from being transferred to the display area DA. The electrostatic transistor portion 122*a* operates in the same manner with respect to the data lines DL2-DLn and elements of the display area DA may be protected from static electricity.

According to at least one embodiment of the inventive concept, when a manufacturing process of the display device 100 is finished, a cut-off voltage Voff is supplied to gates of the thin film transistors included in the electrostatic transistor portion 122*a*. When the display device 100 is manufactured, a routing process may be used to route metal lines for transferring the cut-off voltage Voff to a gate of transistors of the thin film transistor. For example, if the display device 100 is driven, the cut-off voltage Voff is supplied to the gates of the thin film transistors.

In an embodiment, the cut-off voltage Voff is supplied from a power line having a level lower than a threshold level (e.g., -2V). The power line may be located outside the display device 100. For example, a display device manufactured by an amorphous silicon gate integration technology can use a first power supply voltage VSS1 (e.g., about -7V). In an embodiment, a power line for supplying the first power supply voltage VSS1 is connected to gates of the thin film transistors. While the display device is driven, the first power supply voltage VSS1 is applied to the gates of the thin film transistors as a cut-off voltage Voff and each of the thin film transistors T1-T10 is turned off. Thus, an effect of cutting off charges flowing into channels of the thin film transistors T1-T10 may be enhanced.

An active region including pixels is formed in the display area DA. When manufacturing the display device 100, static electricity flowing into the thin film transistors of the active region may be absorbed or cut off by the electrostatic transistor portion 122*a*. When the display device 100 is driven, the cut-off voltage Voff is supplied to gates of the thin film transistors of the electrostatic transistor portion 122*a*. A charge leakage by the electrostatic transistor portion 122*a* may be cut off when the display device 100 is driven. Thus, by controlling a gate voltage of the electrostatic transistor portion 122*a*, the device may be protected from electrostatic electricity and power efficiency may be improved.

Figure 4A:
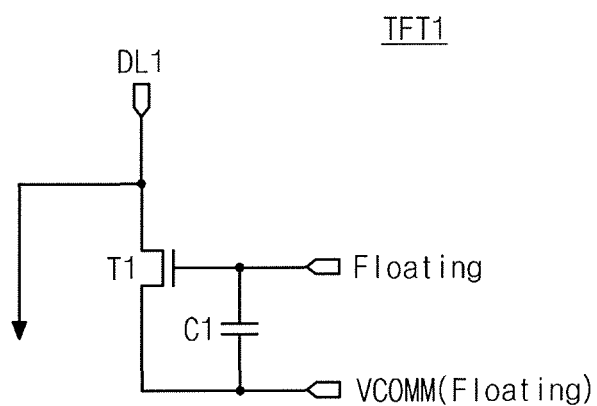
FIG. 4A is a circuit illustrating a bias state of a first thin film transistor of the display device in accordance with an exemplary embodiment of the inventive concept when display device is manufactured.
Figure 4B:
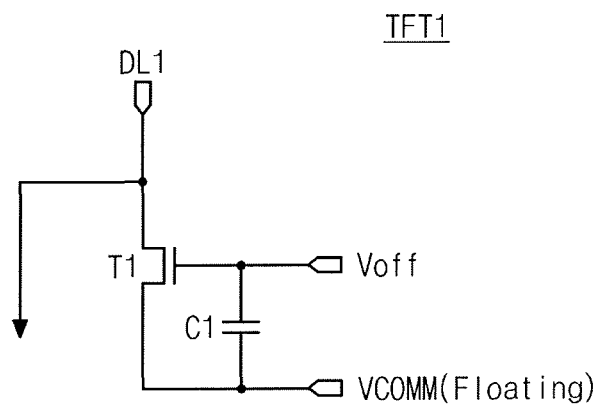
FIG. 4B is a circuit illustrating a bias state of a first thin film transistor in accordance with an exemplary embodiment of the inventive concept when the display device is driven.

FIGS. 4A and 4B are equivalent circuits illustrating bias states of a thin film transistor included in one of the above-described electrostatic transistor portions. FIG. 4A illustrates a bias state of thin film transistor when the display device 100 is manufactured. FIG. 4B illustrates a bias state of thin film transistor when the display device 100 is driven.

An equivalent circuit of the first thin film transistor TFT1 illustrated in FIG. 3 and a bias state of the first thin film transistor TFT1 when the display device is manufactured is illustrated in FIG. 4A. As shown in FIG. 4A, the gate electrode of the first thin film transistor TFT1 is capacitively coupled to the drain electrode of the first thin film transistor TFT1. A capacitor C1 between the gate node and drain node depicts the equivalent modeling of the capacitive connection. The capacitive connection between the gate node and drain node of the first thin film transistor TFT1 is different from a diode connection which directly connects the gate node and drain node of transistor via a contact.

When an electrical connection for the electrostatic transistor portion 122a is not finished, a gate of the first thin film transistor TFT1 is electrically isolated. Thus, a gate of transistor T1 in an equivalent circuit of the first thin film transistor TFT1 is maintained in a floating state. A common ESD electrode VCOMM has a floating state that is electrically isolated when the transistor T1 is turned off.

During manufacturing of the display device 100, if a high voltage (e.g., several kilovolts) due to static electricity flows into the data line DL1, a drain voltage of the transistor T1 becomes excessively high. Accordingly, the transistor T1 is turned on and a channel is formed. Charges passing through the channel of the transistor T1 are charged in the capacitor C1, which may electrically break due to the relatively high voltage. Through that procedure, charges transferred to the data line DL1 may be absorbed by a plurality of thin film transistors. Thus, an electric potential of the data line DL1 becomes gradually lower and pixel elements of the display area DA may be protected from static electricity.

An equivalent circuit of the first thin film transistor TFT1 illustrated in FIG. 3 and a bias state of the first thin film transistor TFT1 when the display device is driven are illustrated in FIG. 4B. The electrostatic transistor portion 122a is configured so that the cut-off voltage Voff is supplied to a gate of the first thin film transistor TFT1 during manufacturing of the display device 100. While the display device 100 is driven, the cut-off voltage Voff is supplied to a gate of the first thin film transistor TFT1. When the display device 100 is normally driven, drive signals (e.g., −7.8V) are applied to the data line DL1.

However, the transistor T1 may maintain a turn-off state due to the cut-off voltage Voff. Thus, when the data line DL1 is driven in a normal voltage range, leakage currents of the thin film transistors including the first thin film transistor TFT1 may be cut off. Even when a drive signal is applied to the data lines DL1-DLn, a leakage current in the electrostatic transistor portion 122a may be cut off.

Figure 5:
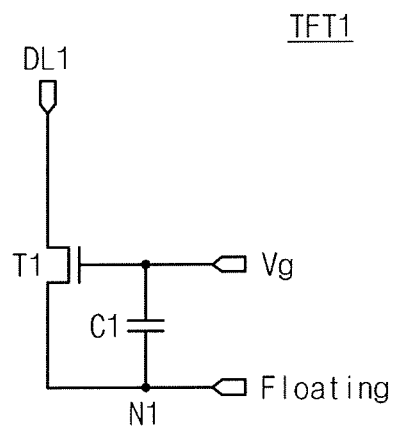
FIG. 5 is a circuit diagram illustrating a node voltage of a first thin film transistor in accordance with an exemplary embodiment of the inventive concept.
Figure 6A:
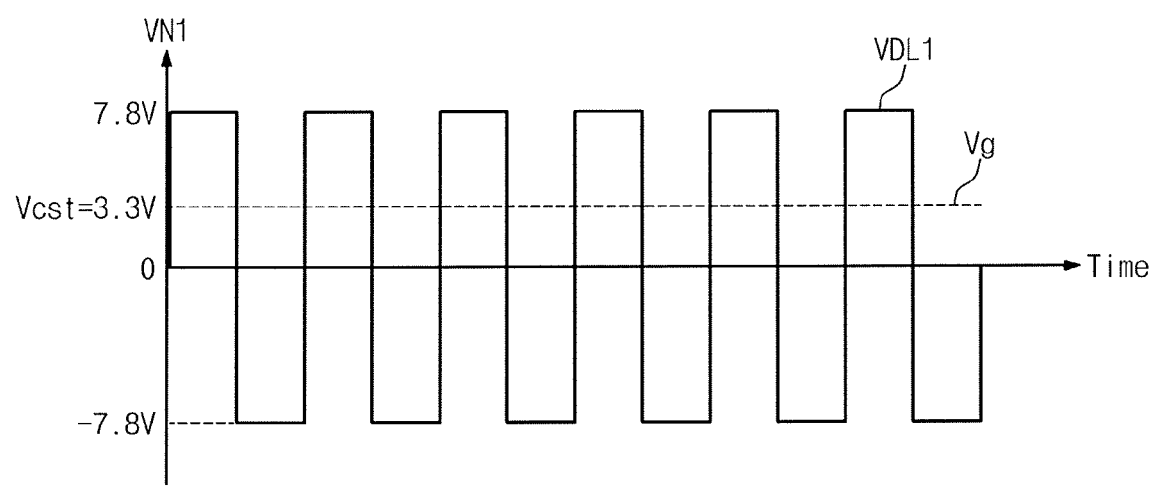
FIG. 6A is a waveform illustrating an example of current leakage of the turned-on a first thin film transistor.
Figure 6A:
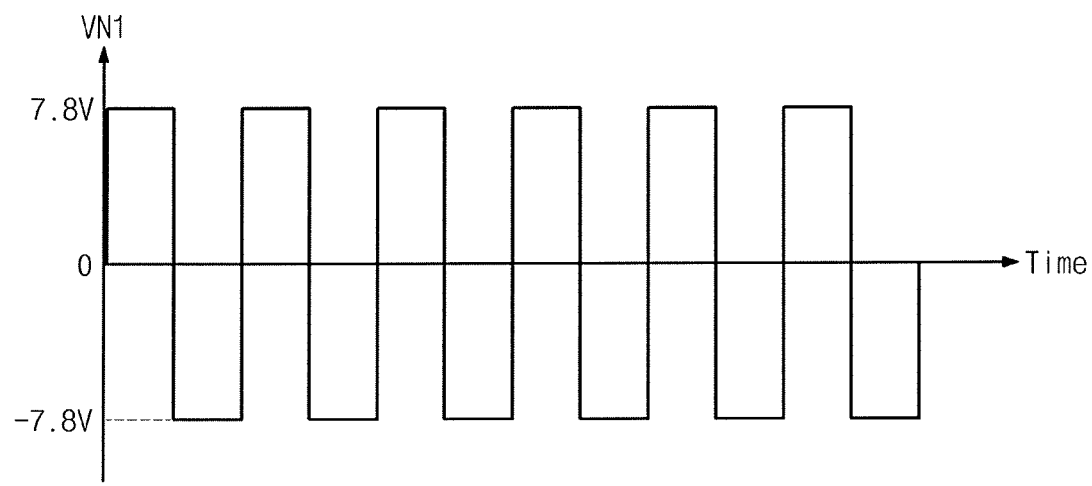
Figure 6B:
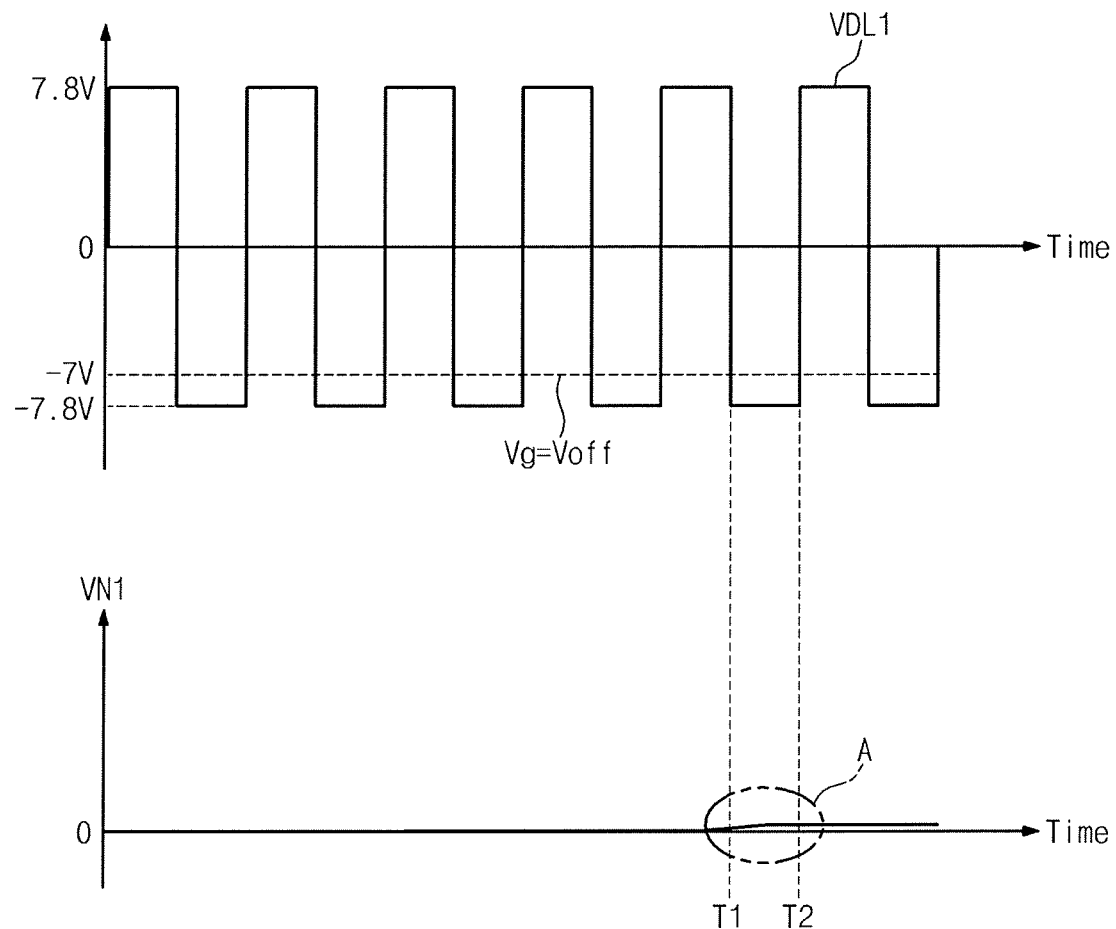
FIG. 6B is a waveform illustrating a block effect of current leakage by a turned-off a first thin film transistor.

FIGS. 5, 6A and 6B are used to illustrate the effect of reduced power consumption caused by an electrostatic transistor portion in accordance with an exemplary embodiment of the inventive concept. FIG. 5 is an equivalent circuit for describing a thin film transistor included in the electrostatic transistor portion. FIG. 6A is a waveform illustrating an operation of the thin film transistor when a cut-off voltage Voff is not provided. FIG. 6B is a waveform illustrating an operation of the thin film transistor when a cut-off voltage Voff is provided.

Referring to FIG. 5, a bias state occurs when the first thin film transistor TFT1 is driven. The bias state of the first thin film transistor TFT1 is determined by a gate voltage Vg and a voltage of the data line DL1 corresponding to a drain voltage or a source voltage. When the cut-off voltage Voff is supplied as the gate voltage Vg to a gate of the first thin film transistor TFT1, a charge leakage may not occur at a first node N1. Thus, when the cut-off voltage Voff is supplied as the gate voltage Vg of the first thin film transistor TFT1, an electric potential of the first node N1 is not greatly changed.

When the cut-off voltage Voff is not supplied as the gate voltage Vg of the first thin film transistor TFT1, a leakage current may flow to the first node N1 by the voltage of the data line DL1. Thus, if the transistor T1 is turned on, an electric potential of the data line DL1 is similar to an electric potential of the first node N1. Accordingly, a current leakage occurs in the common ESD electrode VCOMM. According to at least one exemplary embodiment of the inventive concept, a cut-off voltage Voff that can sufficiently turn off the transistor T1 is supplied as the gate voltage Vg of the first thin film transistor TFT1 to cut off the current leakage. As an example, the cut-off voltage Voff may be about −7V.

FIG. 6A is a waveform illustrating an operation of the thin film transistor when a cut-off voltage Voff is not provided. Referring to FIG. 6A, a first node voltage VN1 is illustrated when a drive signal VDL1 is applied to the data line DL1 and a storage voltage Vcst of about 3.3V is applied as the gate voltage Vg to a gate of the first thin film transistor TFT1. In an embodiment, the drive signal VDL1 is a bipolar voltage that swings between two different voltage levels (e.g., from about −7.8V to about 7.8V). If a storage voltage Vcst is supplied as the gate voltage Vg, the transistor T1 is turned on. Thus, the source voltage and the drain voltage of the transistor T1 may have almost the same value.

The first node voltage VN1 corresponding to the source or drain of the transistor T1 will swing in a manner similar to or the same as the data line DL1. Even when a voltage drop by a threshold voltage of the transistor T1 is considered, the first node voltage VN1 is still a similar level to that of the drive signal VDL1 of the data line DL1. As illustrated in FIG. 6A, a waveform of the first node voltage VN1 may have the same waveform as the drive signal VDL1. Thus, a current leak occurs through a channel of the transistor T1 and power is consumed by the current leakage.

FIG. 6B is a waveform illustrating an operation of the thin film transistor when a cut-off voltage Voff is provided. Referring to FIG. 6B, the drive signal VDL1 is applied to the data line DL1 and the cut off voltage Voff (e.g., about −7V) is applied as the gate voltage Vg of the first thin film transistor TFT1. A first node voltage VN1 of the transistor T1 is illustrated.

The drive signal VDL1 supplied to the data line DL1 may be a bipolar voltage that swings between two different voltage levels (e.g., from about −7.8V to about 7.8V). If the cut-off voltage Voff is supplied as the gate voltage Vg, the transistor T1 maintains a turn-off state regardless of a level of the drive signal VDL1. Thus, a source and a drain of the transistor T1 maintain an electrically isolated state.

When the cut-off voltage Voff is supplied, the first node voltage VN1 corresponding to the source or drain of the transistor T1 may maintain a floating state such that the first node N1 is electrically isolated from the data line DL1. In at least one embodiment, it is desirable that a current leakage is not generated from the data line DL1 and the first node voltage VN1 maintains a level of 0V. Even though the transistor T1 maintains a turn-off state by continuously applying the drive signal VDL1 to the data line DL1, a very small amount of charge may flow into the common ESD electrode VCOMM. However, the amount of charge flowing into the common ESD electrode VCOMM is negligible. A very small change of the first node voltage VN1 when the cut-off voltage Voff is supplied is illustrated in part "A". As illustrated in part "A", at a time T1, even though the first node voltage VN1 is increased by a small level (e.g. by about 0.16V) due to the very small amount of charge that flowed in, a continuous charge leakage may not occur.

Figure 6C:
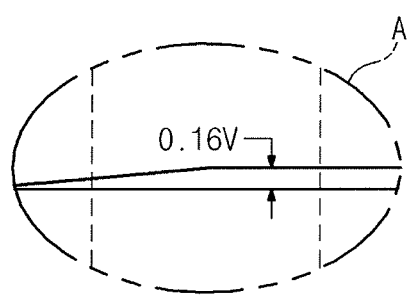
FIG. 6C is an enlarged view illustrating a part "A" of FIG. 6B.

FIG. 6C is an enlarged view illustrating part "A" of FIG. 6B in detail. Referring to FIG. 6C, an electrical potential of the common ESD electrode VCOMM is increased by charges accumulated by continuously applying the drive signal VDL1 to the data line DL1. However, an electrical potential of the common ESD electrode VCOMM is negligibly changed by the small amount of current leakages. For example, as shown in FIG. 6C, the electrical potential is increased by only about 0.16V. Thus, power consumption in the common ESD electrode VCOMM by a leakage current is negligible.

By applying the cut-off voltage Voff, a current leakage through a channel of the transistor T1 is greatly reduced and unintended power consumption in the electrostatic transistor portion 122a may be prevented.

According to at least one exemplary embodiment of the inventive concept, power consumption of a display device may be reduced by removing a path of leakage current generated when the display device is driven.

Although exemplary embodiments of the present inventive concept have been shown and described, it will be appreciated that various changes may be made in these embodiments without departing from the spirit and scope of the inventive concept.

What is claimed is:

1. A display device comprising:
   a data line transferring a drive signal to a display area of the display device;
   a gate line transferring a gate signal to a display area of the display device;
   a gate driver disposed in a peripheral area outside the display area and outputting the gate signal to the gate line using a power supply voltage; and
   an electrostatic transistor portion including a plurality of thin film transistors connected in parallel between the data line and a common ESD electrode of the display device,
   wherein a gate electrode of each of the thin film transistors receives the power supply voltage as a cut-off voltage for turning off each of the thin film transistors.

2. The display device of claim 1, wherein the gate electrode and the drain electrode of each of the thin film transistors are capacitively coupled.

3. The display device of claim 1, wherein the gate electrode of each of the thin film transistors is electrically connected to at least one of a plurality of power lines that are disposed outside the display device and receives the power supply voltage.

4. The display device of claim 1, wherein the cut-off voltage is about −7 V.

5. The display device of claim 1, wherein the cut-off voltage is <=about −2 V.

6. The display device of claim 1, further comprising an electrostatic diode that is connected to the data line and distributes static electricity flowing in the data line to other data lines.

7. The display device of claim 1, further comprising: an electrode line;
   a plurality of bilateral diodes, wherein each bilateral diode is connected between one of a plurality of data lines and the electrode line.

8. The display device of claim 7, wherein a gate electrode and a drain electrode of each of the thin film transistors are capacitively coupled.

9. The display device of claim 7, wherein each bilateral diode comprises:
   a first diode configured to pass current primarily from a corresponding one of the plurality of data lines to the electrode line; and
   a second diode configured to pass current primarily from the electrode line to the corresponding one of the plurality of data lines.

10. The display device of claim 9, wherein the electrode line is commonly connected to all the second diodes.

11. The display device of claim 7, wherein each bilateral diode comprises a pair of transistors of which gates and drains are connected together.

12. The display device of claim 7, wherein each bilateral diode comprises: a first transistor; and a second transistor,
    wherein a gate terminal and a first non-gate terminal of the first transistor, and a first non-gate terminal of the second transistor, are each connected to a first one of the data lines,
    wherein a second non-gate terminal and a gate terminal of the second transistor, and a second non-gate terminal of the first transistor, are each connected to the electrode line.

13. The display device of claim 7, wherein pixels are located in the display area, and each of the bilateral diodes and thin film transistors are located in a peripheral area outside the display area.

14. The display device of claim 7, further comprising a capacitor in parallel with each of the thin film transistors.

15. The display device of claim 7, further comprising a voltage generator configured to apply a voltage to each gate terminal of the thin film transistors to turn-off the transistors.

16. The display device of claim 15, wherein the voltage is=about −2v.

* * * * *